United States Patent [19]
Lee

[11] 4,220,539
[45] Sep. 2, 1980

[54] EDGE SEALS FOR LIQUID FILTERS
[75] Inventor: Wilfred J. Lee, East Syracuse, N.Y.
[73] Assignee: Clarkson Industries, Inc., New York, N.Y.
[21] Appl. No.: 14,831
[22] Filed: Feb. 26, 1979
[51] Int. Cl.² ............................................ B01D 33/22
[52] U.S. Cl. ..................................... 210/401; 210/387
[58] Field of Search .................. 210/77, 400, 401, 387

[56] References Cited
U.S. PATENT DOCUMENTS

| | | | |
|---|---|---|---|
| 3,333,705 | 8/1967 | Lee | 210/251 |
| 3,358,834 | 12/1967 | Hindi | 210/73 |
| 3,876,547 | 4/1975 | Kaess | 210/387 |
| 3,939,077 | 2/1976 | Seibert | 210/401 |
| 3,977,514 | 8/1976 | Kaess | 210/401 X |

Primary Examiner—William A. Cuchlinski, Jr.
Attorney, Agent, or Firm—Curtis, Morris & Safford

[57] ABSTRACT

An improvement in the edge sealing of the filter medium supporting conveyor of a flat bed filter is disclosed. The edges of the conveyor ride along and frictionally engage internally extending shelves formed on each side wall of the filter. The conveyor is so constructed as to provide multiple longitudinal dams that cooperate with the supporting shelf to establish a labyrinthine leakage path that inhibits leakage between the conveyor edges and the supporting shelves.

8 Claims, 4 Drawing Figures

EDGE SEALS FOR LIQUID FILTERS

This invention relates to liquid filters, and more particularly, to an improvement in the side seals of flat bed filters. Filtering apparatus of the general type with which the present invention can be usefully employed is disclosed, for example, in U.S. Pat. No. 3,333,705 issued to Wilfred J. Lee and U.S. Pat. No. 3,876,547 issued to Frank R. Kaess.

Flat bed filters commonly comprise an endless conveyor, the upper run of which carries a strip of filter medium such as paper or cloth. The conveyor and filter medium cooperate with the sides of the filter tank to define a trough adapted to contain a pool of the liquid to be filtered. The conveyor is periodically advanced to carry fresh filter medium into one end of the pool and remove filter medium carrying a layer of the filtered solids from the other end of the pool.

In order to minimize leakage of unfiltered liquid in such filters, sealing means are provided on each side of the pool. Conventional types of seals are shown in the Lee and Kaess patents referred to above, the disclosures of which are incorporated herein by reference. In the structure of the Lee patent the side edge portions of the conveyor have strips of impervious material, e.g., rubber, attached to the upper surface of the conveyor, with the side edges of the filter medium extending thereover. A flexible resilient sealing member is cantilever-mounted on each side of the tank above the conveyor and has a sealing rib that bears downwardly against the portion of the strip of filter medium that overlies the strip of rubber at the edge of the conveyor. The sealing ribs thus cooperate with the rubber strips to minimize the leakage or seepage of unfiltered liquid at the sides of the pool.

The structure of the Kaess patent differs from that of the Lee patent in that the rubber strips attached to the upper surface of the conveyor are replaced by an array of metal clips that can be affixed to the conveyor belt and have planar upper surfaces that cooperate to block edge portions of the conveyor against liquid flow. The upper surfaces of the clips provide a firm surface against which the resilient sealing member can bear to minimize side edge leakage or seepage of the liquid being filtered.

While such seals have been found to be generally satisfactory, they are subject to certain disadvantages that become especially manifest after a relatively long period of service. These disadvantages include wear of the sealing rib that bears against the filter medium, as well as wear and cutting of the filter medium itself. The resilient sealing rib is also subject to chemical attack in some cases by the liquid being filtered. Moreover, such sealing arrangements are costly to install and field replacement of worn parts is inconvenient. Still further, in structures of the type shown in the Lee and Kaess patents, the space under the sealing ribs comprises an air chamber into the opposite ends of which a certain amount of air can leak and additional exhauster capacity is required to handle this air leakage.

Accordingly it is an object of the present invention to provide an improved means of sealing the side edges of the filter medium of a flat bed filter. It is another object of the invention to provide a side seal for the filter medium of a flat bed filter that circumvents the need for a rubbery resilient member that is subject to wear and chemical attack by the liquid being filtered. It is still another object of the invention to eliminate the need for field replacement of the seals due to wear or chemical attack. It is a further object of the invention to provide a conveyor side seal that is less expensive to fabricate and install. It is a still further object of the invention to eliminate the air leakage that occurs through the side seal channels of prior art filters. Other objects of the invention will be in part obvious and in part pointed out hereafter.

The objects and advantages of the present invention are achieved in general by utilizing a labyrinthine seal in which the configuration of the labyrinth is largely defined by the structure of the conveyor itself. The objects of the invention can best be understood and appreciated by reference to the accompanying drawings which illustrate a flat bed filter incorporating a preferred embodiment of the invention. It is of course to be understood that the drawings are for the purpose of illustration only and are not a definition of the limits of the invention, reference being had for this purpose to the appended claims.

Figure 1:
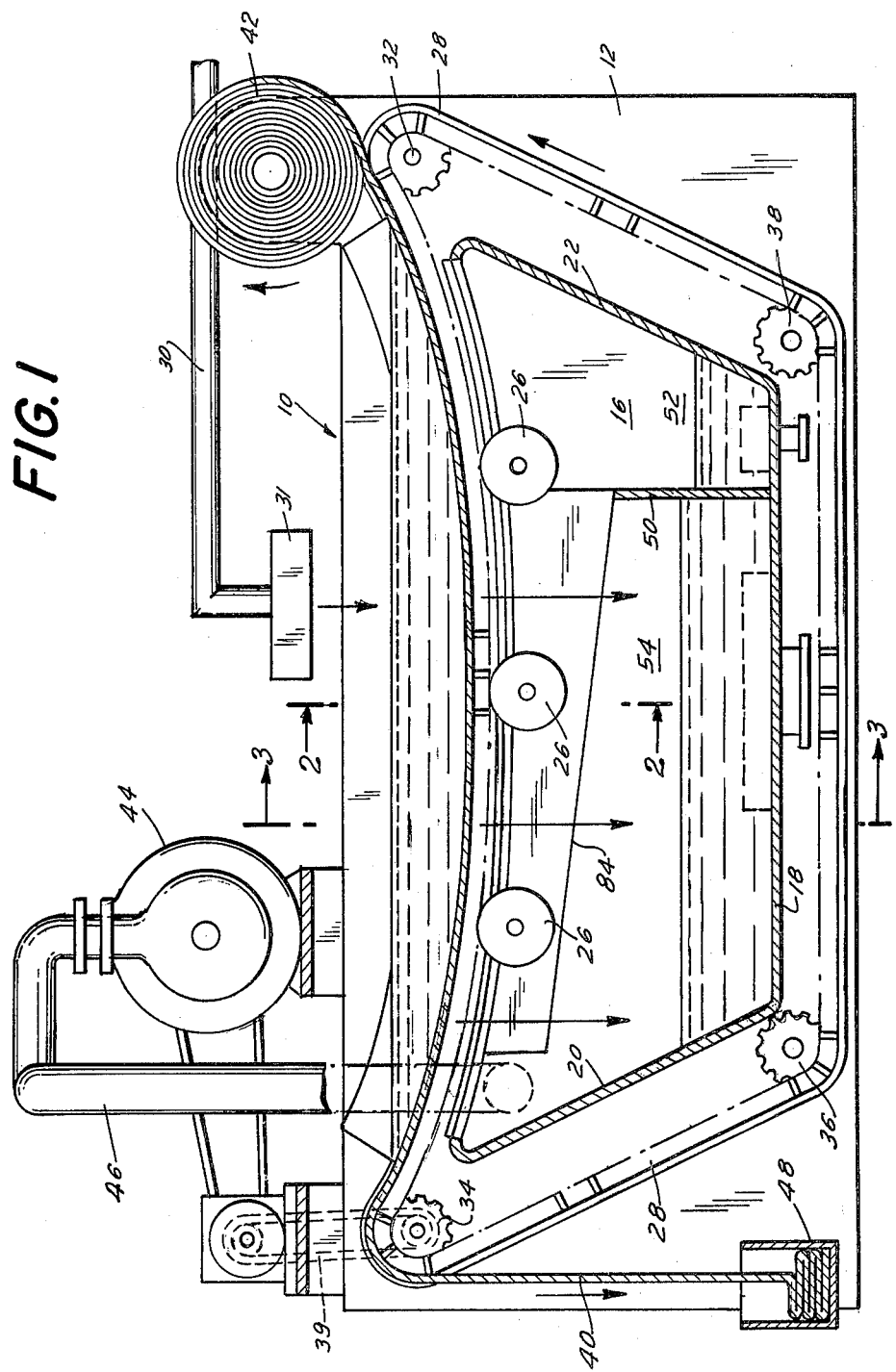
FIG. 1 is a semi-diagrammatic side view of a flat bed filter, constructed in accordance with the present invention and shown largely in section to illustrate the arrangement of the endless conveyor around a sump tank and the relationship of the filter medium to the conveyor.
Figure 2:
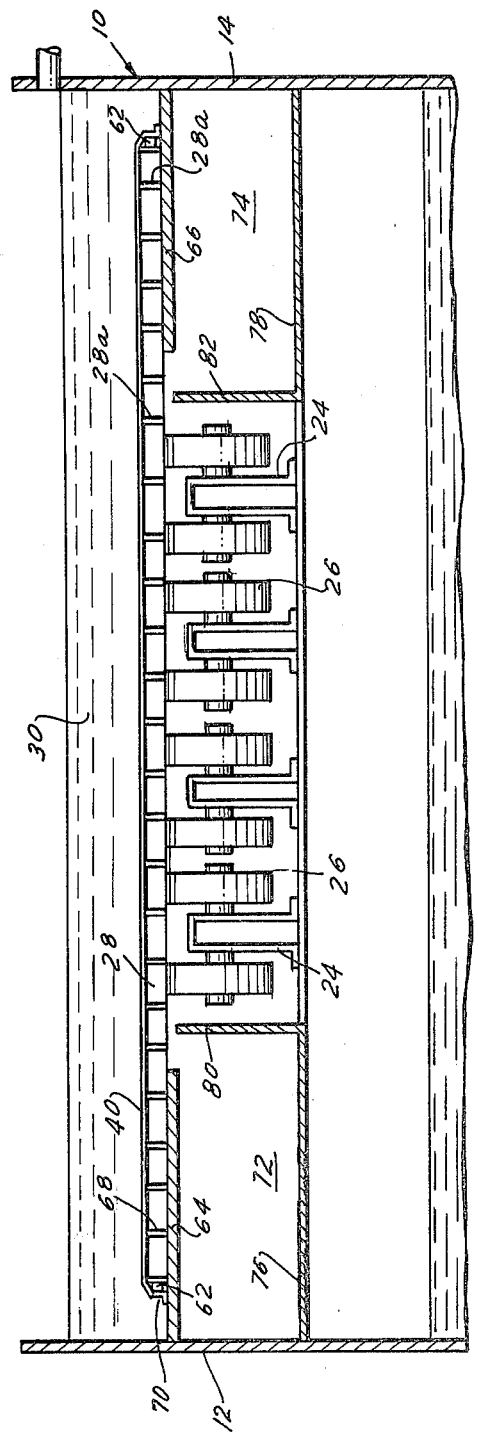
FIG. 2 is a vertical transverse section taken along the line 2—2 of FIG. 1 showing the means for supporting the upper run of the conveyor and in particular the shelves on the tank walls along which the side edges of the conveyor ride.

Referring to the drawings and more particularly to FIGS. 1 and 2, it will be noted that the filter 10 there shown is constructed in a manner generally similar to those of the Lee and Kaess patents identified above. The filter comprises a pair of spaced side walls 12 and 14 (only one of which is shown in FIG. 1). The side walls are interconnected by a plurality of transversely extending plates that are welded to each other and to the walls to form a sump tank 16 of generally inverted trapezoidal configuration. These plates include a bottom wall member 18 and a pair of inclined end walls 20 and 22 which are welded together at their points of juncture to define with side walls 12 and 14, the liquid container or sump tank 16.

Extending across the top of tank 16 there is a supporting grid (not shown in detail) which supports (see FIG. 2) a series of laterally spaced inverted channels 24. The channels 24 in turn serve to support several series of transversely and longitudinally spaced rollers 26 on which a link mesh conveyor 28 rides. As particularly shown in FIG 1, the rollers 26 are so positioned as to cause the conveyor 28 to travel along a sagging path and thereby define with the side walls 12 and 14 a shallow depression or trough adapted to contain a pool 29 of liquid to be filtered. The liquid to be filtered, e.g., a machine tool cutting fluid, is supplied by pipe 30 and flows through distributor 31 to pool 29.

As best shown in FIG. 1, the conveyor 28 is an endless, closed loop conveyor mounted on four sets of sprockets 32, 34, 36 and 38 (only one sprocket of each set being shown in FIG. 1) that cause it to move around sump tank 16. The conveyor is driven through the sprockets 34 by a motor (not shown) and chain drive 39. The filter medium used to effect filtration is in the form of a continuous strip of paper or cloth 40 that is fed from a feed roll 42 mounted on the upper right-hand end of the filter as shown in FIG. 1. From roll 42 the filter medium 40 is fed onto the upper run 28a of the conveyor and is thereby led into and through the pool 29. The sump tank 16 is maintained at a reduced pressure in known manner by an exhauster 44 which is connected to the tank by a pipe 46. The reduced pressure in the sump tank promotes flow of filtrate from pool 29 through medium 40 and conveyor 28 into tank 16.

As the upper run 28a of the conveyor and the strip of filter medium 40 carried thereby move through the pool 29 of liquid suspension to be filtered, the liquid of the suspension is drawn through the filter medium as filtrate and any solids contained in the liquid suspension collect on the surface of the strip 40. At the left-hand end of the filter the strip having the layer of collected solids thereon emerges from pool 29 and is carried by conveyor 28 over the sprockets 34. As the conveyor 28 moves downwardly towards sprockets 36, the filter medium 40 separates therefrom and is collected in a container 48 for suitable disposal.

As the fresh filter medium enters the pool 29, it takes a certain amount of time for a layer of solids to build up thereon and hence the initial filtrate tends to be contaminated to some extent with solids that pass through the filter medium. Accordingly a separate chamber is provided in the sump tank 16 to collect this initial filtrate. More particularly, the sump tank 16 is divided by a partition 50 into a contaminated filtrate chamber 52 and a clear filtrate chamber 54. Contaminated filtrate collecting in chamber 52 can be recirculated in known manner to pipe 30 for re-filtration.

Figure 4:
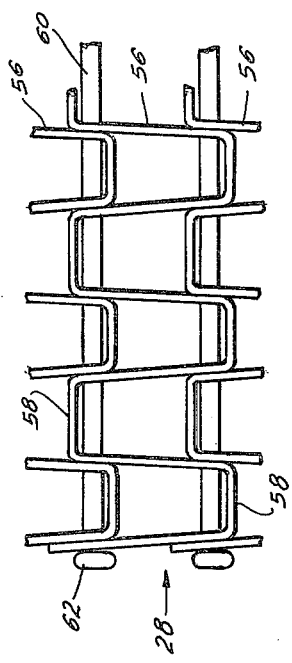
FIG. 4 is a fragmentary plan view of a segment of the conveyor further showing its construction.

The construction of the link mesh conveyor belt is best shown in FIG. 4 of the drawings. Referring to FIG. 4, the conveyor comprises sinuously bent strips 56 extending transversely across the conveyor and consisting of U-shaped segments 58, with the U-shaped segments of each strip 56 being partially nested in the U-shaped segments of an adjacent strip. The U-shaped segments 58 of adjacent strips 56 are secured together by connecting rods 60 that pass therethrough. At the opposite ends the rods 60 are provided with caps 62 to limit lateral movement thereof. The construction is such that the adjacent strips 56 may be relatively rotated about the rods 60 through a limited arc sufficient to enable the conveyor to pass around the sprockets 32-38.

Figure 3:
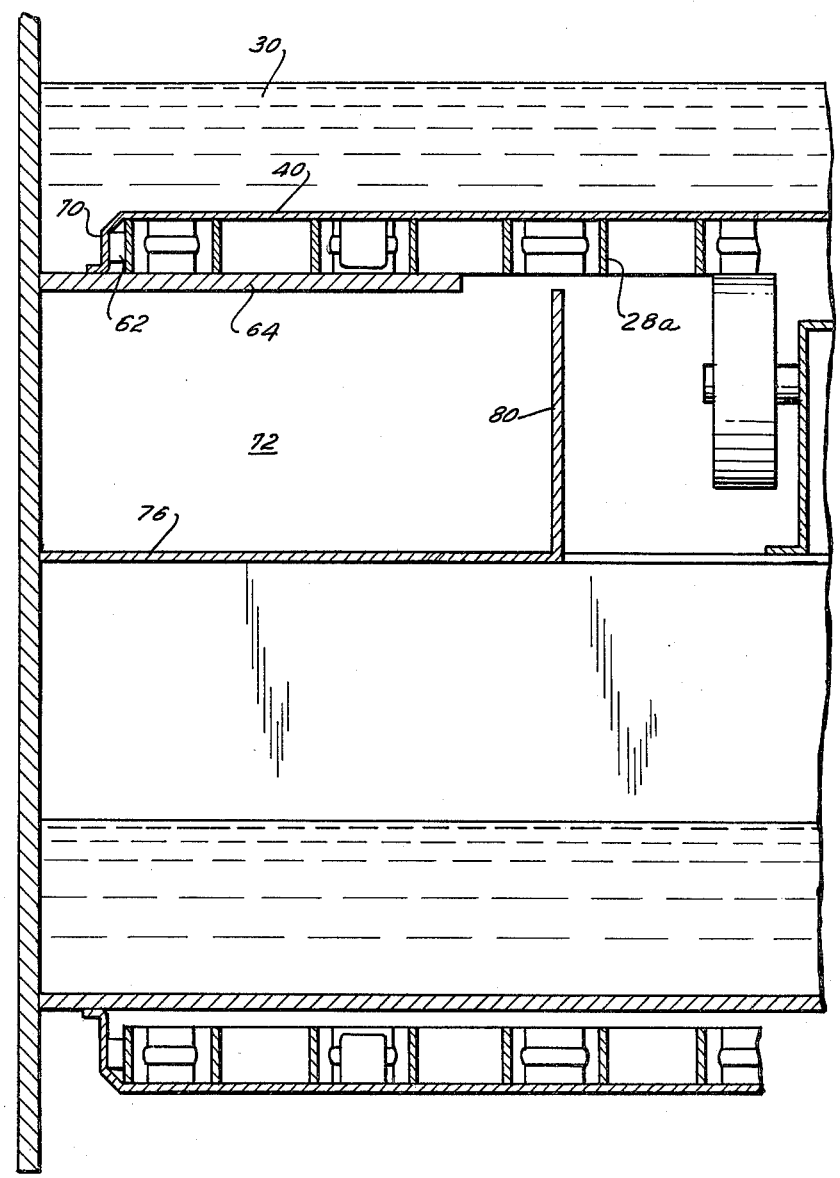
FIG. 3 is an enlarged fragmentary vertical section taken on the line 3—3 of FIG. 1, showing the manner in which one of the supporting shelves and the edge portions of the conveyor and filter medium cooperate to define a labyrinthine seal.

Turning now to FIGS. 2 and 3 of the drawings, the sides 12 and 14 of the filter tank are provided with inwardly extending, substantially horizontal shelves 64 and 66 along which the sides of the upper run 28a of conveyor 28 ride. The construction of the conveyor is such that it cooperates with the shelves 64 and 66 to define a series of webs or dams that run lengthwise of the filter, that are transversely spaced across each shelf, and that frictionally engage the shelves. Thus in order to escape at the sides of the conveyor, the liquid from pool 30 must pass between the upper surface of, e.g., shelf 64 and the lower edge of several webs or dams 68. The present invention is based on applicants' discovery that it is unnecessary to use a special cantilevered sealing rib of the type disclosed in U.S. Pat. Nos. 3,333,705 and 3,876,547 and that acceptable sealing can be achieved by using a combination of horizontal shelves to support the edge portions of the conveyor and a conveyor configuration that cooperates with each shelf to define a series of spaced dams frictionally engaging the shelf to impede the flow of liquid between the conveyor and shelf.

The extent to which the edge of the conveyor overlaps the shelf does not appear to be particularly critical. In accordance with the invention the overlap should be such that at least two spaced longitudinal webs cooperate with the upper surface of the shelf to provide a labyrinthine leakage path. Typically, an overlap of say four to eight webs of the conveyor engaging the surface of shelf 64 may be used. It should be noted that with the conveyor structure shown in FIG. 4 the strips 56 also form transverse dams that tend to inhibit longitudinal flow along the shelves.

Still referring to FIGS. 2 and 3, there is a relatively small clearance between the connecting rods 60 and the strips 56 to permit relative movement thereof and it has been found that there is a tendency for liquid to leak through this clearance. Accordingly as particularly shown in FIGS. 2 and 3, the side edges of the filter medium desirably extend beyond the sides of the conveyor and downwardly over the caps 62 of connecting rods 60 to form the overlapping portions 70. The overlaps 70 preferably extend downwardly into contact with the upper surfaces of shelves 64 and 66.

As shown in FIGS. 2 and 3, the present filter may also be provided at opposite sides of the filter tank with leakage troughs 72 and 74 defined by the shelves 76 and 78 that extend inwardly under the shelves 64 and 66, respectively, and the vertical partitions 80 and 82. The partitions 80 and 82 are positioned inwardly of the inner ends of shelves 64 and 66, respectively, so that any liquid leaking along shelves 64 and 66 will drop into the troughs 72 and 74, respectively. As indicated by the sloping line 84 of FIG. 1, any liquid leaking into the troughs 72 and 74 is directed into the contaminated filtrate chamber 52 for re-filtration.

It should perhaps be noted that while the foregoing description has been couched in terms of preventing liquid leakage from pool 29 between conveyor run 28a and shelves 64 or 66 into the troughs 72 and 74 or the sump tank 16, the most important function of the present seals is to impede the passage of suspended solids. To the extent that liquid free from suspended solids flows through the seals it is the same as the clear filtrate in compartment 54 and hence such flow is unobjectionable.

From the foregoing description it should be apparent that the present invention provides a substantially improved means of sealing the side edges of the filter medium of a flat bed filter. The rubber-like sealing member of the prior structures with its tendency to wear and deteriorate chemically can be completely eliminated, and acceptable sealing can be achieved by causing the edges of the conveyor to move along a path in which the bottom of the conveyor is flush with the upper surface of the supporting shelf. Multiple dams are provided to inhibit flow of liquid transversely across the supporting shelf. Also since the entire upper surface of the conveyor and its associated filter medium are submerged in the pool of liquid to be filtered, air leakage under the edges of the conveyor to the sump tank is eliminated. Thus a simple and less costly seal is provided.

It is of course to be understood that the foregoing description is intended to be illustrative only and that numerous changes can be made in the specific structure described without departing from the spirit of the invention as defined in the appended claims.

I claim:

1. A flat bed filter comprising side walls, an endless link mesh conveyor belt, means for supporting said conveyor and moving it horizontally between said side walls, a sheet of filter medium resting on said conveyor and movable therewith, said side walls, conveyor and filter medium cooperating to define a trough adapted to contain a pool of liquid to be filtered, a compartment below said conveyor for collecting liquid passing through said filter medium and conveyor, said side walls being provided with substantially horizontal liquid impervious shelves extending therealong and positioned below and in supporting contact with opposite edge portions of said conveyor, the links of said conveyor forming a plurality of transversely spaced dams extending lengthwise along each side of said conveyor and frictionally engaging the tops of said shelves as said conveyor moves therealong to cause said transversely spaced dams to provide an obstructed leakage path and thereby minimize leakage from said pool around the edges of said conveyor to said compartment.

2. A filter according to claim 1 wherein the filter medium extends beyond the side edges of said conveyor and downwardly along the sides thereof.

3. A filter according to claim 1 wherein said conveyor consists essentially of an array of partially nested U-shaped members interconnected by spaced transverse rods extending therethrough.

4. A filter according to claim 1 including leakage troughs located along each side of said filter and positioned to receive any liquid that may flow between the upper surfaces of said shelves and the edge portions of said conveyor.

5. A flat bed filter comprising side walls, an endless link mesh conveyor belt, means for supporting said conveyor and moving it horizontally between said side walls, a sheet of filter medium resting on said conveyor and movable therewith, said side walls, conveyor and filter medium cooperating to define a trough adapted to contain a pool of liquid to be filtered, a compartment below said conveyor for collecting liquid passing through said filter medium and conveyor, said side walls being provided internally with substantially horizontal liquid impervious shelves extending therealong and positioned below and in supporting contact with opposite edge portions of said conveyor, the links of said conveyor forming a grid of transversely and longitudinally spaced vertical dams extending lengthwise along each side of said conveyor and frictionally engaging the tops of said shelves as said conveyor moves therealong to cause said spaced dams to provide an obstructed leakage path and thereby minimize leakage from said pool around the edges of said conveyor to said compartment.

6. A filter according to claim 5 wherein there are at least two of said transversely spaced dams engaging each of said shelves.

7. A flat bed filter comprising side walls, an endless link mesh conveyor belt, means for supporting said conveyor and moving it horizontally between said side walls, a sheet of filter medium resting on said conveyor and movable therewith, said side walls, conveyor and filter medium cooperating to define a trough adapted to contain a pool of liquid to be filtered, a compartment below said conveyor for collecting liquid passing through said filter medium and conveyor, said side walls being provided internally with substantially horizontal liquid impervious shelves extending therealong and positioned below and in supporting contact with opposite edge portions of said conveyor, said conveyor consisting essentially of an array of partially nested U-shaped members interconnected by longitudinally spaced transversely oriented rods extending through overlapping portions of said members, the edge portions of said conveyor frictionally engaging the tops of said shelves as said conveyor moves therealong to provide a labyrinthine leakage path and thereby minimize leakage from said pool around the edges of said conveyor to said compartment.

8. A filter according to claim 7 wherein said filter medium extends beyond the side edges of said conveyor and over the ends of said connecting rods.

* * * * *